(12) United States Patent
Sawada et al.

(10) Patent No.: US 7,023,582 B2
(45) Date of Patent: Apr. 4, 2006

(54) IMAGE PROCESSING APPARATUS

(75) Inventors: Takayuki Sawada, Tokyo (JP); Sunao Tabata, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 931 days.

(21) Appl. No.: 09/933,036

(22) Filed: Aug. 21, 2001

(65) Prior Publication Data
US 2003/0038996 A1 Feb. 27, 2003

(51) Int. Cl.
G06F 15/00 (2006.01)

(52) U.S. Cl. .................. 358/1.9; 358/2.1; 358/515; 358/530; 358/525; 358/501; 382/300; 382/162; 382/164; 382/165; 382/167; 382/176; 345/601; 345/602; 345/604

(58) Field of Classification Search ............ 358/1.9, 358/2.1, 2.99, 3.01, 3.23, 505, 500, 515, 358/530, 525, 538, 296, 501, 529; 382/300, 382/162–165, 167, 176; 345/601, 602, 604; 347/43
See application file for complete search history.

(56) References Cited

U.S. PATENT DOCUMENTS

| | | | | |
|---|---|---|---|---|
| 5,032,903 A | * | 7/1991 | Suzuki et al. | 358/530 |
| 5,113,248 A | * | 5/1992 | Hibi et al. | 358/501 |
| 5,331,440 A | * | 7/1994 | Kita et al. | 358/529 |
| 5,357,353 A | | 10/1994 | Hirota | 358/530 |
| 5,398,124 A | | 3/1995 | Hirota | 358/530 |
| 5,710,824 A | * | 1/1998 | Mongeon | 382/162 |
| 5,729,360 A | * | 3/1998 | Kita et al. | 358/500 |

(Continued)

FOREIGN PATENT DOCUMENTS

JP    4-200171    7/1992

(Continued)

OTHER PUBLICATIONS

U.S. Appl. No. 09/651,283, filed Aug. 30, 2000, Tabata.

(Continued)

*Primary Examiner*—Kimberly Williams
*Assistant Examiner*—Beniyam Menberu
(74) *Attorney, Agent, or Firm*—Foley & Lardner LLP

(57) ABSTRACT

There is disclosed an image processing apparatus for generating an address based on a difference (MAX−MIN) between a maximum value MAX and a minimum value MIN among signals CMY indicating three primary colors of a color image for each pixel, and generating a black ink signal based on data read from a lookup table in which the data is read from the generated address, so that a black ink strength is independently set with respect to density and chroma of the image. Moreover, the lookup table with the black ink signal and an undercolor signal stored therein has a storage capacity of a number obtained by totaling a number at which the difference (MAX−MIN) between the maximum value MAX and the minimum value MIN is an integral multiple of a predetermined value and a number at which the difference is other than the integral multiple and the maximum value MAX is equal to a maximum value of a defined region. Thereby, all combinations of the maximum value MAX and minimum value MIN are linearly interpolated without disposing any storage region.

4 Claims, 9 Drawing Sheets

U.S. PATENT DOCUMENTS

| | | | |
|---|---|---|---|
| 6,118,550 A * | 9/2000 | Hayashi | 358/296 |
| 6,389,161 B1 * | 5/2002 | Krabbenhoft | 382/167 |
| 6,499,829 B1 * | 12/2002 | Tabata et al. | 347/43 |
| 6,574,010 B1 * | 6/2003 | Hirosugi et al. | 358/1.9 |
| 2002/0005962 A1 * | 1/2002 | Iwasaki et al. | 358/1.9 |
| 2002/0113982 A1 * | 8/2002 | Chang et al. | 358/1.9 |

FOREIGN PATENT DOCUMENTS

| | | |
|---|---|---|
| JP | 4-341061 | 11/1992 |
| JP | 5-14696 | 1/1993 |

OTHER PUBLICATIONS

U.S. Appl. No. 09/521,950, filed Mar. 9, 2000, Tabata.

* cited by examiner

IMAGE PROCESSING APPARATUS

BACKGROUND OF THE INVENTION

The present invention relates to a color image forming apparatus, particularly to an image processing apparatus for performing proper color reproduction of a digital color copying machine.

In a conventional digital color copying machine, a color image of an original is subjected to color separation into three colors of red (R), green (G), and blue (B) for each pixel, reflectance is read, and the image is converted to digital image data of three colors R, G, B. The three-color digital image data is subjected to a color correction processing such as a density conversion processing, undercolor removal processing, black ink addition processing, and masking processing, and four-color digital image density data of cyan (C), magenta (M), yellow (Y), black (K) is obtained.

A dot image as a digital image is recorded on a copy sheet based on the four-color digital image density data.

In the black ink addition processing, a black toner having a predetermined black ink addition amount is added to the other three-color toners C, M, Y, density is replenished in a high density region, and reproducibility in a shadow portion of the image can be enhanced. Moreover, in the undercolor removal processing, a predetermined undercolor removal amount of a gray component is removed from the other three-color toners, and replaced with the black toner, so that color registration is strengthened, and reproducibility of a character, and the like can be enhanced.

Moreover, since respective optimum values of the black ink addition amount of the black ink addition processing and the undercolor removal amount of the undercolor removal processing differ depending upon the type of the original image to be formed. Therefore, there is proposed an apparatus for inputting the type of the original, such as a photograph, text, and the like and changing the black ink addition amount and undercolor removal amount respectively.

Furthermore, in Jpn. Pat. Appln. KOKAI Publication No. 4-200271, the black ink addition amount and undercolor removal amount are changed in accordance with a judgment result of white/black or color.

Additionally, in Jpn. Pat. Appln. KOKAI Publication No. 4-341061, the black ink addition amount and undercolor removal amount are changed in accordance with the judgment result (4-stage evaluation) of a chromatic color or an achromatic color.

Moreover, in Jpn. Pat. Appln. KOKAI Publication No. 5-14696, the black ink addition amount and undercolor removal amount are determined in accordance with chroma of HVC conversion for conversion to data of hue (H), value (V), chroma (C).

However, even in the aforementioned method, it is difficult to allow proper gray reproduction to be compatible with high chroma color representation, it is also difficult to allow proper black reproduction of a photograph portion to be compatible with proper reproduction of a black character, and further there is a problem that dark color reproduction becomes unstable.

BRIEF SUMMARY OF THE INVENTION

An object of the present invention is to provide an image processing apparatus in which compatibility of proper gray reproduction and high chroma color representation, proper black reproduction of a photograph portion, reproduction of a black character, and elimination of instability of dark color reproduction can be realized.

To achieve the aforementioned object, according to the present invention, there is provided an image processing apparatus for subjecting color image data constituted of three primary colors to black ink addition, the apparatus comprising black ink generating means for generating a black ink signal in accordance with a difference between a maximum value and a minimum value among three values indicating the three primary colors for each pixel in the color image data, and the minimum value.

Moreover, according to the present invention, there is provided an image processing apparatus for subjecting color image data constituted of three primary colors to black ink addition, the apparatus comprising: address generating means for generating an address based on a difference between a maximum value and a minimum value among three values indicating the three primary colors for each pixel in the color image data, and the minimum value; a lookup table in which data is read from the address generated by the address generating means; and black ink generating means for generating a black ink signal based on the data read from the lookup table.

Furthermore, according to the present invention, there is provided an image processing apparatus for subjecting color image data constituted of three primary colors to black ink addition, the apparatus comprising: undercolor generating means for generating an undercolor signal in accordance with a difference between a maximum value and a minimum value among three values indicating the three primary colors for each pixel in the color image data, and the minimum value; and correcting means for correcting the three values indicating the three primary colors for each pixel based on the undercolor signal generated by the undercolor generating means.

Additionally, according to the present invention, there is provided an image processing apparatus for subjecting color image data constituted of three primary colors to black ink addition, the apparatus comprising: address generating means for generating an address in accordance with a difference between a maximum value and a minimum value among three values indicating the three primary colors for each pixel in the color image data, and the minimum value; a lookup table in which data is read from the address generated by the address generating means; undercolor generating means for generating an undercolor signal based on the data read from the lookup table; and correcting means for correcting the three values indicating the three primary colors for each pixel based on the undercolor signal generated by the undercolor generating means.

Moreover, according to the present invention, there is provided an image processing apparatus for subjecting color image data constituted of three primary colors to black ink addition, the apparatus comprising: address generating means for generating an address based on a difference between a maximum value and a minimum value among three values indicating the three primary colors for each pixel in the color image data, and the minimum value; a lookup table having a storage capacity of a number obtained by totaling a number at which the difference between the maximum value and the minimum value is an integral multiple of a predetermined value and a number at which the difference is other than the integral multiple and the maximum value is equal to a maximum value of a defined region, and in which data is read from the address generated by the address generating means; and black ink generating means for outputting the data read from the lookup table as a black ink signal when the difference between the maximum value and the minimum value is the integral multiple of the predetermined value or when the maximum value is equal to the maximum value of the defined region, and for interpolating/generating and outputting the black ink signal from the data read from the lookup table and data read from an address adjacent to the address when the difference between the maximum value and the minimum value is not the integral multiple of the predetermined value and when the maximum value is not equal to the maximum value of the defined region.

Furthermore, according to the present invention, there is provided an image processing apparatus for subjecting color image data constituted of three primary colors to black ink addition, the apparatus comprising: address generating means for generating an address based on a difference between a maximum value and a minimum value among three values indicating the three primary colors for each pixel in the color image data, and the minimum value; a lookup table having a storage capacity of a number obtained by totaling a number at which the difference between the maximum value and the minimum value is an integral multiple of a predetermined value and a number at which the difference is other than the integral multiple and the maximum value is equal to a maximum value of a defined region, and in which data is read from the address generated by the address generating means; undercolor generating means for outputting the data read from the lookup table as an undercolor signal when the difference between the maximum value and the minimum value is the integral multiple of the predetermined value or when the maximum value is equal to the maximum value of the defined region, and for interpolating/generating and outputting the undercolor signal from the data read from the lookup table and data read from an address adjacent to the address when the difference between the maximum value and the minimum value is not the integral multiple of the predetermined value and when the maximum value is not equal to the maximum value of the defined region; and correcting means for correcting the three values indicating the three primary colors based on the undercolor signal outputted from the undercolor generating means.

Additionally, according to the present invention, there is provided an image processing apparatus for subjecting color image data constituted of three primary colors to black ink addition, the apparatus comprising: first generating means for generating a first undercolor component based on a difference between a maximum value and a minimum value among three values indicating the three primary colors for each pixel in the color image data, and the minimum value; second undercolor generating means for generating a second undercolor component based on the three values indicating the three primary colors for each pixel in the color image data; first subtracting means for subtracting the first undercolor component generated by the first generating means from the three values indicating the three primary colors for each pixel in the color image data; second subtracting means for subtracting the second undercolor component generated by the second undercolor generating means from a predetermined first constant; and calculating means for outputting a calculation result obtained by multiplying a predetermined second constant by a subtraction result of the first subtracting means and further dividing a multiplication result by the subtraction result of the second subtracting means.

Moreover, according to the present invention, there is provided an image processing apparatus for subjecting color image data constituted of three primary colors to black ink addition, the apparatus comprising: identifying means for identifying a pixel attribute of each pixel in the color image data and outputting a pixel attribute signal; first address generating means for generating a first address based on a difference between a maximum value and a minimum value among three values indicating the three primary colors for each pixel in the color image data, and the minimum value; a first lookup table in which data is read from the first address generated by the first address generating means; processing means for generating a prospective first black ink signal based on the data read from the first lookup table; second address generating means for generating a second address based on the three values indicating the three primary colors for each pixel in the color image data; a second lookup table in which data is read from the second address generated by the second address generating means; and black ink signal selecting means for selecting/outputting either one of the data read from the second lookup table and the prospective first black ink signal generated by the processing means as a black ink signal in accordance with the image attribute signal of the pixel outputted from the identifying means.

Furthermore, according to the present invention, there is provided an image processing apparatus for subjecting color image data constituted of three primary colors to black ink addition, the apparatus comprising: identifying means for identifying a pixel attribute of each pixel in the color image data and outputting a pixel attribute signal; first address generating means for generating a first address based on a difference between a maximum value and a minimum value among three values indicating the three primary colors for each pixel in the color image data, and the minimum value; a first lookup table in which data is read from the first address generated by the first address generating means; processing means for generating a prospective first undercolor signal based on the data read from the first lookup table; second address generating means for generating a second address based on the three values indicating the three primary colors for each pixel in the color image data; a second lookup table in which data is read from the second address generated by the second address generating means; undercolor signal selecting means for selecting/outputting either one of the data read from the second lookup table and the prospective first undercolor signal generated by the processing means as an undercolor signal in accordance with the image attribute signal of the pixel outputted from the identifying means; and correcting means for correcting the three values indicating the three primary colors based on the undercolor signal selected/outputted by the undercolor signal selecting means.

Additionally, according to the present invention, there is provided an image processing apparatus for subjecting color image data constituted of three primary colors to black ink addition, the apparatus comprising: identifying means for identifying a pixel attribute of each pixel in the color image data and outputting a pixel attribute signal; first undercolor generating means for generating a first undercolor component based on three values indicating the three primary colors for each pixel in the color image data; second undercolor generating means for generating a second undercolor component based on the three values indicating the three primary colors for each pixel in the color image data; third undercolor generating means for generating a third undercolor component based on the three values indicating the three primary colors for each pixel in the color image data; first subtracting means for subtracting the first undercolor component generated by the first undercolor generating means from the three values indicating the three primary colors for each pixel in the color image data; second subtracting means for subtracting the second undercolor component generated by the second undercolor generating means from a predetermined first constant; first calculating means for outputting prospective first corrected three primary colors obtained by multiplying a predetermined second constant by a subtraction result of the first subtracting means, and further dividing a multiplication result by the subtraction result of the second subtracting means; second calculating means for subtracting the third undercolor component from the three values indicating the three primary colors for each pixel in the color image data and outputting prospective second corrected three primary colors; and selecting means for selecting/outputting either one of the prospective second corrected three primary colors outputted from the second calculating means and the prospective first corrected three primary colors outputted from the first calculating means as corrected three primary colors in accordance with the image attribute signal of the pixel outputted from the identifying means.

DETAILED DESCRIPTION OF THE INVENTION

One embodiment of the present invention will be described hereinafter with reference to the drawings.

Figure 1:
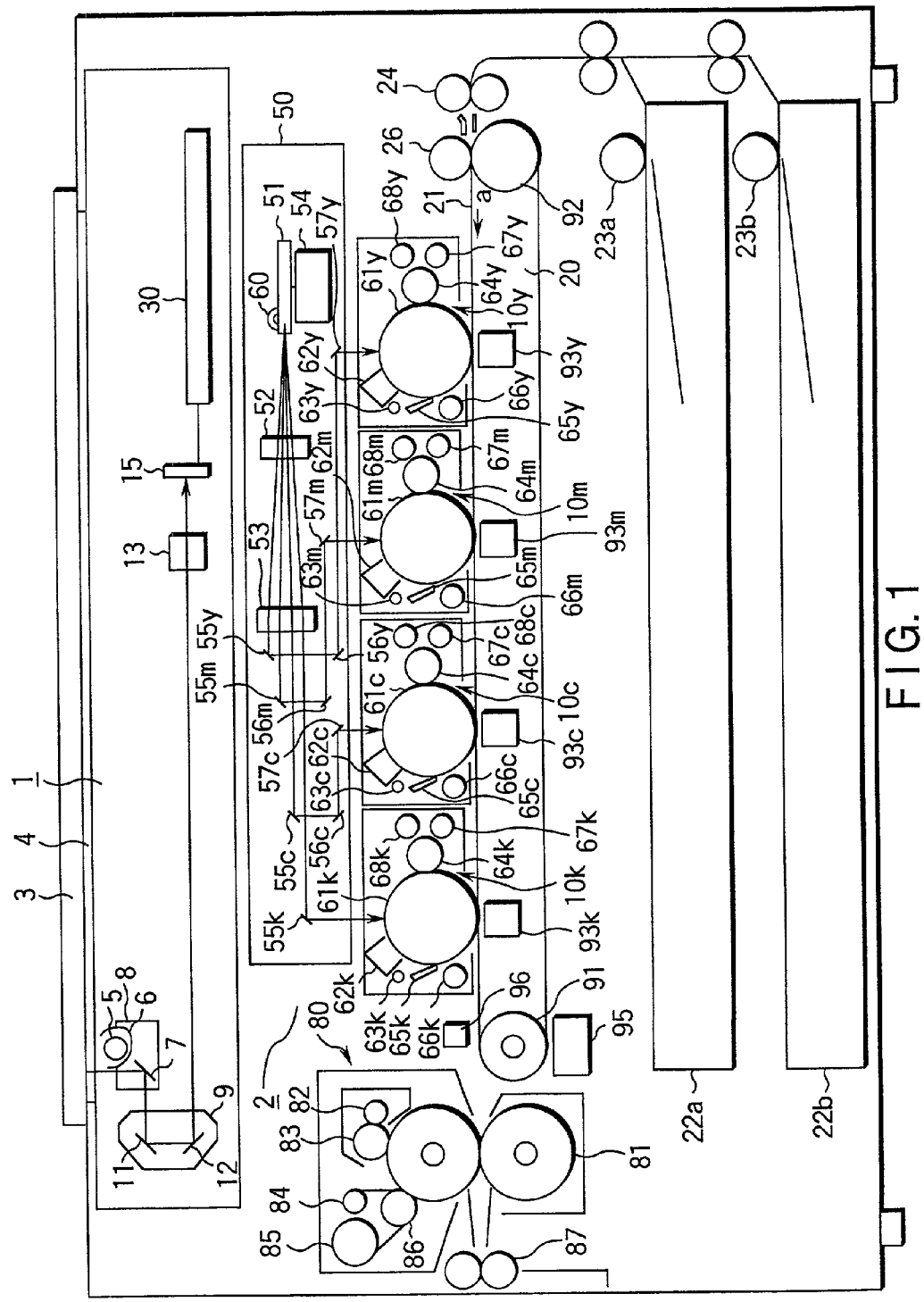
FIG. 1 is a diagram schematically showing an inner constitution of a color image forming apparatus such as a digital color copying machine for forming a duplicate image of a color image according to the present invention.

FIG. 1 schematically shows an inner constitution of a color image forming apparatus such as a digital color copying machine for forming a duplicate image of a color image according to the present invention. The color image forming apparatus is roughly constituted of a color scanner section 1 as image reading means for reading the color image on an original, and a color printer section 2 as image forming means for forming the duplicate image of the read color image.

The color scanner section 1 has an original base cover 3 disposed thereon, and an original base 4 disposed opposite to the original base cover 3 in a closed state and formed of transparent glass for setting an original thereon. Disposed under the original base 4 are an exposure lamp 5 for lighting the original laid on the original base 4, a reflector 6 for collecting light from the exposure lamp 5 onto the original, and a first mirror 7 for deflecting a reflected light from the original in a leftward direction with respect to the drawing. The exposure lamp 5, reflector 6, and first mirror 7 are fixed to a first carriage 8. The first carriage 8 is driven by a pulse motor (not shown) via a toothed belt (not shown) and moved in parallel along a lower surface of the original base 4.

A second carriage 9 is disposed on the left side of the first carriage 8 in the drawing, that is, in a direction in which the light reflected by the first mirror 7 is guided, and is movable in parallel with the original base 4 via a driving mechanism (not shown) such as a toothed belt and direct-current motor. A second mirror 11 for deflecting the reflected light guided from the original via the first mirror 7 in a downward direction in the drawing, and a third mirror 12 for deflecting the reflected light from the second mirror 11 in a rightward direction in the drawing are disposed at right angles to each other in the second carriage 9. The second carriage 9 is driven by the first carriage 8, and moved in parallel along the original base 4 at a ½ speed with respect to the first carriage 8.

An image forming lens 13 for forming the reflected light from the third mirror 12 into an image at a predetermined magnification is disposed in a plane including an optical axis of the light reflected back by the second and third mirrors 11, 12. A CCD type color image sensor (photoelectric conversion device) 15 for converting the reflected light with a focusing property given thereto by the image forming lens 13 into an electric signal is disposed in a plane crossing substantially at right angles to the optical axis of the light passed through the image forming lens 13. An output from the CCD type color image sensor 15 is connected to a main control section 30 described later.

Therefore, when the light from the exposure lamp 5 is focused onto the original on the original base 4 by the reflector 6, the reflected light from the original is incident upon the color image sensor 15 via the first mirror 7, second mirror 11, third mirror 12, and image forming lens 13. Here, the incident light is converted to an electric signal in accordance with three primary colors of red (R), green (G), blue (B) light.

The color printer section 2 includes first to fourth image forming sections 10y, 10m, 10c, 10k for forming images separated by respective color components, that is, images of four colors yellow (Y), magenta (M), cyan (C), and black (K) based on a known subtractive color mixing process.

A conveying mechanism 20 is disposed under the respective image forming sections 10y, 10m, 10c, 10k, and includes a conveyor belt 21 as conveying means for conveying the respective color images formed by the respective image forming sections in a direction of an arrow a in FIG. 1. The conveyor belt 21 is wound and extended between a driving roller 91 rotated by a motor (not shown) in the direction of the arrow a, and a driven roller 92 disposed apart from the driving roller 91 at a predetermined distance, and is endlessly run in the direction of the arrow a at a constant speed. Additionally, the image forming sections 10y, 10m, 10c, 10k are disposed in series along a conveying direction of the conveyor belt 21.

The respective image forming sections 10y, 10m, 10c, 10k include photosensitive drums 61y, 61m, 61c, 61k as image carriers whose outer peripheral surfaces are formed to be rotatable in the same direction in positions contacting the conveyor belt 21. The respective photosensitive drums 61y, 61m, 61c, 61k are rotated by a motor (not shown) at a predetermined peripheral speed.

The respective photosensitive drums 61y, 61m, 61c, 61k are disposed so that their axes are disposed an equal interval a part, at right angles to a direction in which the image is conveyed by the conveyor belt 21. Additionally, in the following description, the axial line direction of the respective photosensitive drums 61y, 61m, 61c, 61k are referred to as a main scanning direction (second direction). A rotation direction of the photosensitive drums 61y, 61m, 61c, 61k, that is, the rotation direction (direction of the arrow a in FIG. 1) of the conveyor belt 21 is referred to as a sub-scanning direction (first direction).

Around the respective photosensitive drums 61y, 61m, 61c, 61k, charging devices 62y, 62m, 62c, 62k as charging means extended in the main scanning direction, destaticizers 63y, 63m, 63c, 63k, developing rollers 64y, 64m, 64c, 64k as developing means similarly extended in the main scanning direction, lower agitating rollers 67y, 67m, 67c, 67k, upper agitating rollers 68y, 68m, 68c, 68k, transfer devices 93y, 93m, 93c, 93k as transferring means similarly extended in the main scanning direction, cleaning blades 65y, 65m, 65c, 65k similarly extended in the main scanning direction, and waste toner collecting screws 66y, 66m, 66c, 66k are disposed in order along the rotation direction of the respective corresponding photosensitive drums 61y, 61m, 61c, 61k.

Additionally, the respective transfer devices 93y, 93m, 93c, 93k are disposed in positions for holding the conveyor belt 21 with the corresponding photosensitive drums 61y, 61m, 61c, 61k, that is, inside the conveyor belt 21. Moreover, exposure points by an exposure device 50 described later are formed on outer peripheral surfaces of the photosensitive drums 61y, 61m, 61c, 61k between the charging devices 62y, 62m, 62c, 62k and the developing rollers 64y, 64m, 64c, 64k.

Sheet cassettes 22a, 22b are disposed under the conveying mechanism 20, and contain a plurality of sheets P as image forming mediums to which the images formed by the respective image forming sections 10y, 10m, 10c, 10k are to be transferred.

Pick-up rollers 23a, 23b for taking the sheets P one by one from uppermost portions of the sheet cassettes 22a, 22b are disposed in one end of the sheet cassette 22a, 22b and in the vicinity of the driven roller 92. A registration roller 24 for matching a tip end of the sheet P taken out of the sheet cassette 22a or 22b with a tip end of a y toner image formed on the photosensitive drum 61y of the image forming section 10y is disposed between the pick-up rollers 23a, 23b and the driven roller 92.

Additionally, the toner images formed on the other photosensitive drums 61m, 61c, 61k are supplied to respective transfer positions in accordance with a conveying timing of the sheet P conveyed on the conveyor belt 21.

An adsorption roller 26 for applying an electrostatic adsorbing force to the sheet P conveyed via the registration roller 24 at a predetermined timing is disposed between registration roller 24 and the first image forming section 10y and in the vicinity of the driven roller 92, that is, substantially on an outer periphery of the driven roller 92 via the conveyor belt 21. Additionally, the axial line of the adsorption roller 26 is disposed in parallel with the axial line of the driven roller 92.

A position deviation sensor 96 for detecting the position of the image formed on the conveyor belt 21 is disposed on one end of the conveyor belt 21 and in the vicinity of the driving roller 91, that is, substantially on the outer periphery of the driving roller 91 via the conveyor belt 21. The position deviation sensor 96 is constituted, for example, of a transmission or reflection type optical sensor.

A conveyor belt cleaning device 95 for removing toner attached to the conveyor belt 21 or paper waste of the sheet P is disposed on the outer periphery of the driving roller 91 and on the conveyor belt 21 on a downstream side of the position deviation sensor 96.

A fixing device 80 is disposed in a direction in which the sheet P conveyed via the conveyor belt 21 is detached from the driving roller 91 and further conveyed. In the fixing device, the sheet P is heated at predetermined temperature, and the toner image transferred onto the sheet P is molten and fixed to the sheet P. The fixing device 80 is constituted of a pair of heat rollers 81, oil application rollers 82, 83, web take-up roller 84, web roller 85, web pressing roller 86, and the like. The toner image formed on the sheet P is fixed to the sheet, and the sheet is discharged via a pair of sheet discharge rollers 87.

The exposure device 50 for forming respective color-separated electrostatic latent images on the outer peripheral surfaces of the respective photosensitive drums 61y, 61m, 61c, 61k includes a semiconductor laser oscillator 60. Light emission of the oscillator is controlled based on image data (y, m, c, k) for respective separated colors by an image processing apparatus 36 described later. On an optical path of the semiconductor laser oscillator 60, a polygon mirror 51, rotated by a polygon motor 54, for reflecting and scanning a laser beam, and fθ lenses 52, 53 for correcting a focus of the laser beam reflected via the polygon mirror 51 and forming the image are disposed in order.

First turn-back mirrors 55y, 55m, 55c, 55k for turning respective color laser beams passed through the fθ lens 53 toward the exposure positions of the respective photosensitive drums 61y, 61m, 61c, 61k, and second and third turn-back mirrors 56y, 56m, 56c, 57y, 57m, 57c for further turning the laser beams turned by the first turn-back mirrors 55y, 55m, 55c are disposed between the fθ lens 53 and the respective photosensitive drums 61y, 61m, 61c, 61k.

Additionally, the laser beam for black is turned back by the first turn-back mirror 55k, and guided onto the photosensitive drum 61k without being passed through the other mirrors.

Figure 2:
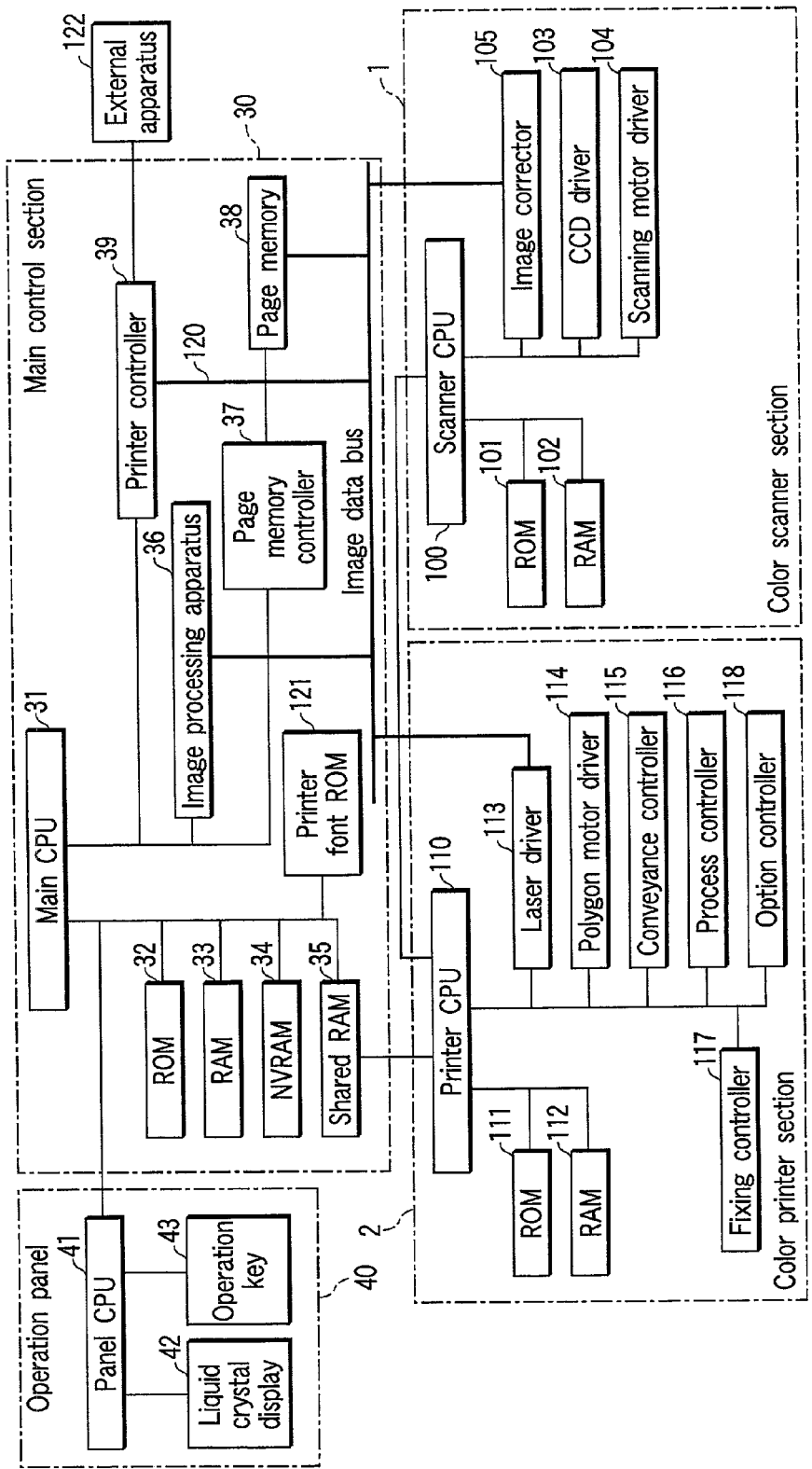
FIG. 2 is a block diagram schematically showing a flow of signal for electric connection and control of the color image forming apparatus in FIG. 1.

FIG. 2 is a block diagram schematically showing a flow of signal for electric connection and control of the digital copying machine in FIG. 1. In FIG. 2, a control system is constituted of three CPUs: a main central processing unit (CPU) 31 in a main control section 30; a scanner CPU 100 of the color scanner section 1; and a printer CPU 110 of the color printer section 2.

The main CPU 31 performs bidirectional communication with the printer CPU 110 via a shared random access memory (RAM) 35, and issues an operation instruction, and the printer CPU 110 returns a state status. The printer CPU 110 performs serial communication with the scanner CPU 100, and issues the operation instruction, and the scanner CPU 100 returns the state status.

An operation panel 40 includes a liquid crystal display 42, various operation keys 43, and a panel CPU 41 connected to the display and keys, and is connected to the main CPU 31.

The main control section 30 is constituted of the main CPU 31, a read only memory (ROM) 32, RAM 33, NVRAM 34, shared RAM 35, image processing apparatus 36, page memory controller 37, page memory 38, printer controller 39, and printer font ROM 121.

The main CPU 31 manages the entire control. The ROM 32 stores control program, firmware for setting various data in an internal register described later, and the like. The RAM 33 temporarily stores data.

The nonvolatile random access memory (NVRAM) 34 is a nonvolatile memory backed up a battery (not shown), and holds the stored data even when power supply is interrupted.

The shared RAM 35 is for use in the bidirectional communication performed between the main CPU 31 and the printer CPU 110.

The page memory controller 37 stores and reads image information with respect to the page memory 38. The page memory 38 has a region in which the image information for a plurality of pages can be stored, and can store data constituted by compressing the image information from the color scanner section 1 for each page.

Font data corresponding to print data is stored in the printer font ROM 121. The printer controller 39 uses the font data stored in the printer font ROM 121 at a resolution corresponding to data indicating the resolution imparted to the print data to develop the print data from an external apparatus 122 such as a personal computer in the image data.

The color scanner section 1 is constituted of: the scanner CPU 100 for managing total control; a ROM 101 in which the control program, and the like are stored; a RAM 102 for storing data; a CCD driver 103 for driving the color image sensor 15; a scanning motor driver 104 for controlling rotation of a scanning motor for moving the first carriage 8, and the like; an image corrector 105; and the like.

The image corrector 105 is constituted of: an A/D conversion circuit for converting R, G, B analog signals outputted from the color image sensor 15 into respective digital signals; a shading correction circuit for correcting a dispersion of the color image sensor 15, or a fluctuation of a threshold level with respect to an output signal from the color image sensor 15 because of an ambient temperature change; a line memory for once storing the digital signal subjected to the shading correction by the shading correction circuit; and the like.

The color printer section 2 is constituted of: the printer CPU 110 for managing the whole control; a ROM 111 in which the control program, and the like are stored; a RAM 112 for storing the data; a laser driver 113 for driving the semiconductor laser oscillator 60; a polygon motor driver 114 for driving the polygon motor 54 of the exposure device 50; a conveyance controller 115 for controlling conveyance of the sheet P by the conveying mechanism 20; a process controller 116 for controlling a process of using the charging device, developing roller and transfer device to perform charging, developing and transferring; a fixing controller 117 for controlling the fixing device 80; and an option controller 118 for controlling option.

Additionally, the image processing apparatus 36, page memory 38, printer controller 39, image corrector 105, and laser driver 113 are connected to one another via an image data bus 120.

Figure 3:
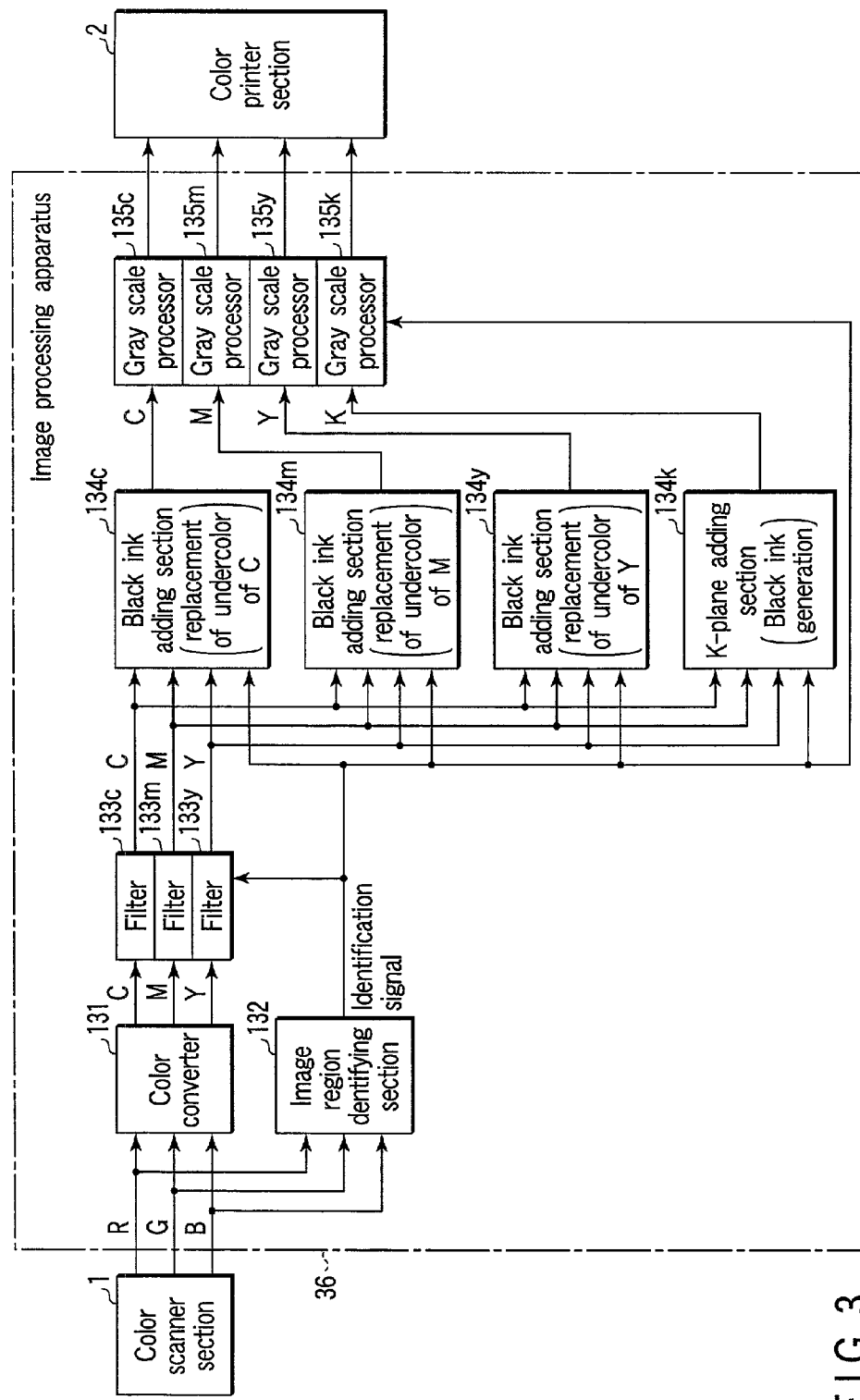
FIG. 3 is a block diagram schematically showing a constitution of an image processing apparatus.

FIG. 3 schematically shows a constitution of the image processing apparatus 36. In FIG. 3, image data R (red), G (green), B (blue) outputted from the color scanner section 1 are transmitted to a color converter 131 and image region identifying section 132 of the image processing apparatus 36. The color converter 131 converts the inputted image data R, G, B to cyan (C), magenta (M), and yellow (Y) color signals.

Moreover, the image region identifying section 132 identifies image regions such as a character region and photograph region from the inputted image data R, G, B and outputs an identification signal. The identification signal outputted from the image region identifying section 132 is outputted to filters 133c, 133m, 133y, black ink adding sections 134c, 134m, 134y, and K-plane adding section 134k, and gray scale processors 135c, 135m, 135y, 135k described later.

Color signals C, M, Y outputted from the color converter 131 are sent to the filters 133c, 133m, 133y, respectively.

The filter 133c subjects the inputted color signal C to a filter processing in response to the inputted identification signal and outputs the signal to the black ink adding sections 134c, 134m, 134y, and K-plane adding section 134k.

The filter 133m subjects the inputted color signal M to the filter processing in response to the inputted identification signal and outputs the signal to the black ink adding sections 134c, 134m, 134y, and K-plane adding section 134k.

The filter 133y subjects the inputted color signal Y to the filter processing in response to the inputted identification signal and outputs the signal to the black ink adding sections 134c, 134m, 134y, and K-plane adding section 134k.

The black ink adding section 134c replaces an undercolor of the color signal C from the inputted color signals C, M, Y and identification signal and transmits an output to the gray scale processor 135c.

The black ink adding section 134m replaces the undercolor of the color signal M from the inputted color signals C, M, Y and identification signal and transmits an output to the gray scale processor 135m.

The black ink adding section 134y replaces the undercolor of the color signal Y from the inputted color signals C, M, Y and identification signal and transmits an output to the gray scale processor 135y.

The K-plane adding section 134k generates black ink from the inputted color signals C, M, Y and identification signal and transmits an output to the gray scale processor 135k.

The gray scale processor 135c subjects the color signal C inputted in response to the inputted identification signal, for example, to an error diffusion processing in accordance with a number of recordable bits of the color printer section 2, and outputs the signal to the color printer section 2.

The gray scale processor 135m subjects the color signal M inputted in response to the inputted identification signal, for example, to the error diffusion processing in accordance with the number of recordable bits of the color printer section 2, and outputs the signal to the color printer section 2.

The gray scale processor 135y subjects the color signal Y inputted in response to the inputted identification signal, for example, to the error diffusion processing in accordance with the number of recordable bits of the color printer section 2, and outputs the signal to the color printer section 2.

The gray scale processor 135k subjects the color signal K inputted in response to the inputted identification signal, for example, to the error diffusion processing in accordance with the number of recordable bits of the color printer section 2, and outputs the signal to the color printer section 2. In the color printing, a black ink color (black) turns to blackish gray from three colors C, M, Y. Therefore, a signal K of a black-color portion is generated so that the black-color portion can exactly be printed as a black pixel.

Figure 4:
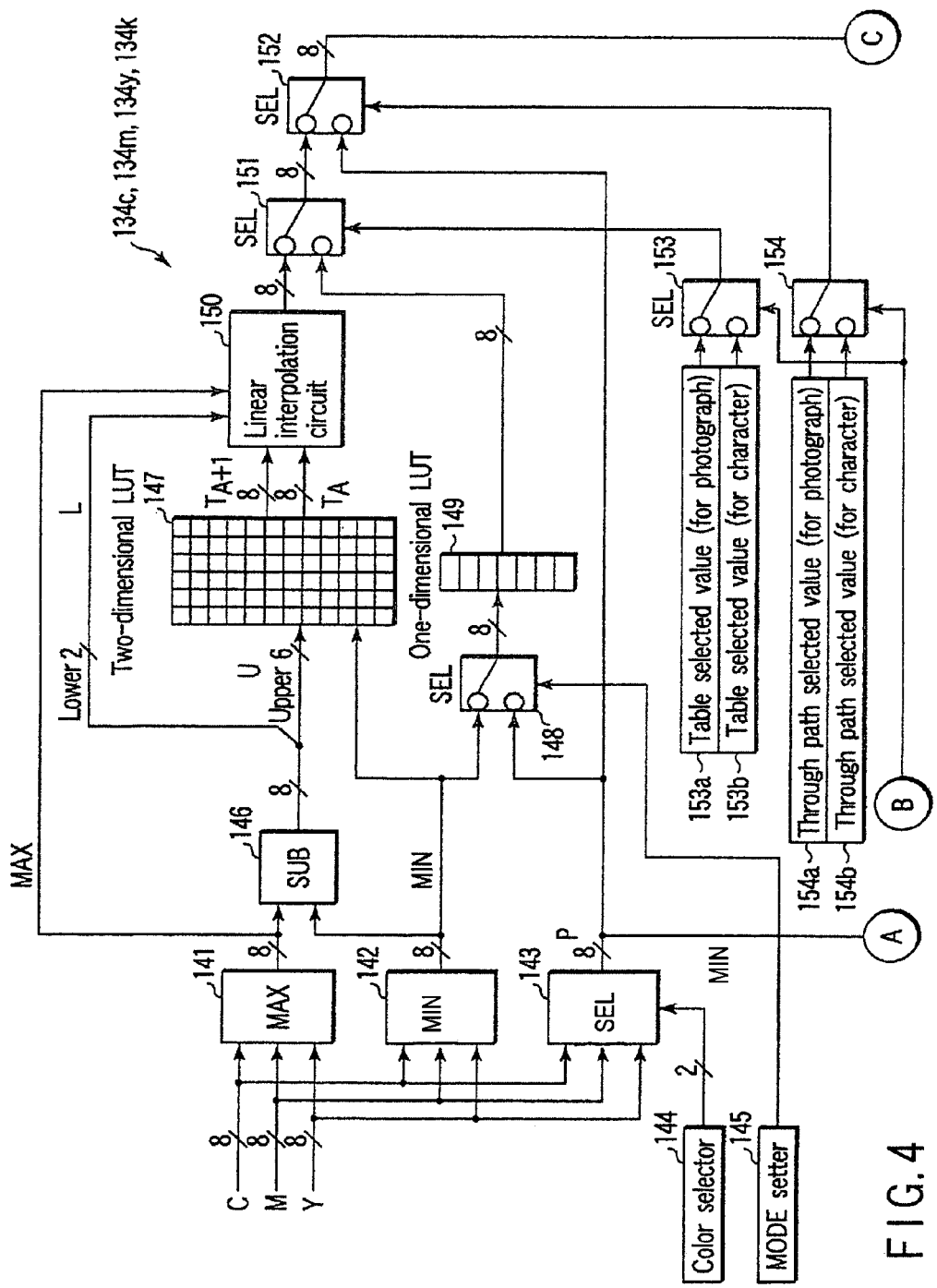
FIG. 4 is a diagram showing a constitution example of a black ink adding section.
Figure 5:
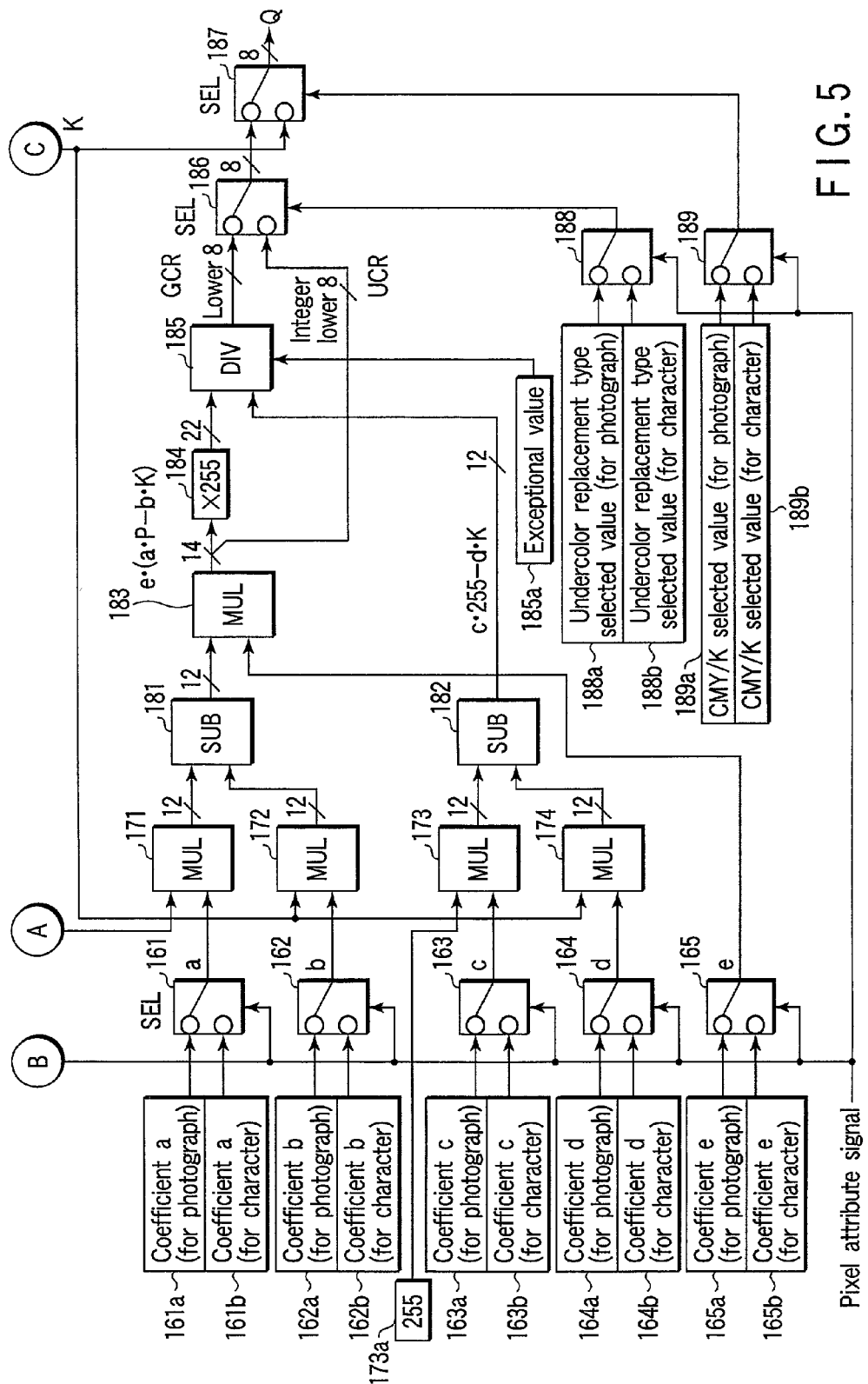
FIG. 5 is a diagram showing a constitution example of the black ink adding section.

FIGS. 4, 5 show a constitution example of the black ink adding sections 134c, 134m, 134y, and K-plane adding section 134k according to the present invention.

The color signal C subjected to the filter processing by the filter 133c, color signal M subjected to the filter processing by the filter 133m, and color signal Y subjected to the filter processing by the filter 133y are inputted to a maximum value detector 141, minimum value detector 142, and selector 143.

The maximum value detector (MAX) 141 detects a maximum value MAX, and outputs the value to a subtracter (SUB) 146 and linear interpolation circuit 150.

The minimum value detector (MIN) 142 detects a maximum value MIN, and outputs the value to the subtracter (SUB) 146, a two-dimensional lookup table (LUT) 147 and a selector 148.

The selector 143 selects/outputs the inputted color signals C, M, Y in response to a selection signal from a color selector 144. Additionally, the color selector 144 is an internal register set based on the firmware stored beforehand in the ROM 32 by the main CPU 31. A mode setter 145 outputs the selection signal corresponding to a set mode. The color signal selected by the selector 143 is outputted as data P to selectors 148, 152, and multiplier (MUL) 171.

The subtracter 146 outputs upper six bits as a difference between the inputted maximum value MAX and minimum value MIN to the two-dimensional LUT 147, and outputs lower two bits to the linear interpolation circuit 150.

The selector 148 selects the inputted minimum value MIN and data P in response to the selection signal from the mode (MODE) setter 145 and outputs the value and data to a one-dimensional lookup table (LUT) 149. Additionally, the mode setter 145 is an internal register whose mode is automatically set based on the firmware stored beforehand in the ROM 32 by the main CPU 31. The mode setter 145 outputs the selection signal corresponding to the set mode. Examples of the set mode include a black ink addition mode, γ conversion mode, and the like.

The two-dimensional LUT 147 outputs data $T_{A+1}$ and $T_A$ to the linear interpolation circuit 150 based on the inputted upper six bits of a difference (MAX−MIN) between the maximum value MAX and the minimum value MIN from the subtracter 146 and the minimum value MIN from the minimum value detector 142 as described later in detail.

Figure 6:
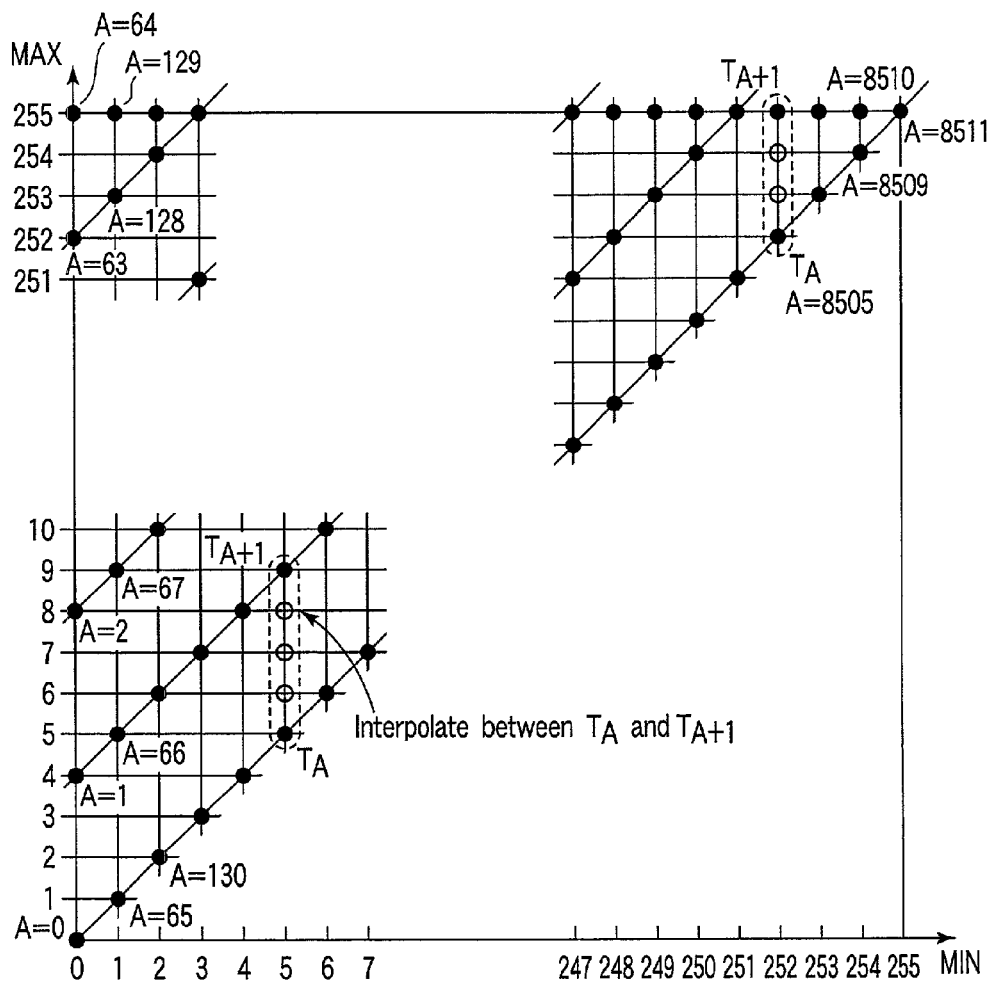
FIG. 6 is a schematic diagram showing a constitution of a two-dimensional lookup table.

FIG. 6 shows a constitution of the two-dimensional lookup table 147. As shown in FIG. 6, the data $T_{A+1}$ and $T_A$ are outputted from the two-dimensional LUT 147. For example, when A=8505 indicates $T_A$, there are two values interpolated between the data $T_{A+1}$ and $T_A$.

The linear interpolation circuit 150 interpolates between the data $T_{A+1}$ and $T_A$ and outputs the data to a selector 151. That is, the linear interpolation circuit 150 interpolates between the data $T_{A+1}$ and $T_A$ as shown in FIG. 6.

In this manner, since it is unnecessary to dispose a storage region with respect to all combinations of the maximum and minimum values, the storage region can be saved by the two-dimensional LUT 147 and linear interpolation circuit 150.

The one-dimensional LUT (256 ways) 149 outputs the data to the selector 151 based on the inputted value.

The selector 151 selects the inputted data from the linear interpolation circuit 150 and data from the one-dimensional LUT 149 in response to the selection signal from a selector 153 and outputs the data to the selector 152. Additionally, the selector 153 switches a table selected value (for a photograph) and table selected value (for a character) stored in internal registers 153a, 153b and outputs the selection signal to the selector 151 in response to the identification signal from the image region identifying section 132 or another pixel attribute signal. Moreover, the table selected value (for the photograph) and table selected value (for the character) stored in the internal registers 153a, 153b are set based on the firmware stored beforehand in the ROM 32 by the main CPU 31.

The selector 152 selects the data from the selector 151 and data P from the selector 143 in response to the selection signal from a selector 154 and outputs data K to multipliers (MUL) 172, 174, and selector 187. Additionally, the selector 154 switches a through path selected value (for the photograph) and through path selected value (for the character) stored in internal registers 154a, 154b and outputs the selection signal to the selector 152 in response to the identification signal from the image region identifying section 132 or another pixel attribute signal. Moreover, the through path selected value (for the photograph) and through path selected value (for the character) stored in the internal registers 154a, 154b are set based on the firmware stored beforehand in the ROM 32 by the main CPU 31.

On the other hand, a selector 161 switches a coefficient a (for the photograph) and coefficient a (for the character) stored in internal registers 161a, 161b and outputs the coefficient a to the multiplier 171 in response to the identification signal from the image region identifying section 132 or another pixel attribute signal. Additionally, the coefficient a (for the photograph) and coefficient a (for the character) stored in the internal registers 161a, 161b are set based on the firmware stored beforehand in the ROM 32 by the main CPU 31.

A selector 162 switches a coefficient b (for the photograph) and coefficient b (for the character) stored in internal registers 162a, 162b and outputs the coefficient b to the multiplier 172 in response to the identification signal from the image region identifying section 132 or another pixel attribute signal. Additionally, the coefficient b (for the photograph) and coefficient b (for the character) stored in the internal registers 162a, 162b are set based on the firmware stored beforehand in the ROM 32 by the main CPU 31.

A selector 163 switches a coefficient c (for the photograph) and coefficient c (for the character) stored in internal registers 163a, 163b and outputs the coefficient c to a multiplier (MUL) 173 in response to the identification signal from the image region identifying section 132 or another pixel attribute signal. Additionally, the coefficient c (for the photograph) and coefficient c (for the character) stored in the internal registers 163a, 163b are set based on the firmware stored beforehand in the ROM 32 by the main CPU 31.

A selector 164 switches a coefficient d (for the photograph) and coefficient d (for the character) stored in internal registers 164a, 164b and outputs the coefficient d to the multiplier 174 in response to the identification signal from the image region identifying section 132 or another pixel attribute signal. Additionally, the coefficient d (for the photograph) and coefficient d (for the character) stored in the internal registers 164a, 164b are set based on the firmware stored beforehand in the ROM 32 by the main CPU 31.

A selector 165 switches a coefficient e (for the photograph) and coefficient e (for the character) stored in internal registers 165a, 165b and outputs the coefficient e to a multiplier (MUL) 183 in response to the identification signal from the image region identifying section 132 or another pixel attribute signal. Additionally, the coefficient e (for the photograph) and coefficient e (for the character) stored in the internal registers 165a, 165b are set based on the firmware stored beforehand in the ROM 32 by the main CPU 31.

The multiplier 171 multiplies the inputted data P from the selector 143 by the coefficient a and outputs the data to a subtracter (SUB) 181.

The multiplier 172 multiplies the inputted data K from the selector 152 by the coefficient b and outputs the data to the subtracter 181.

The multiplier 173 multiplies a constant 255 stored in an internal register 173a by the coefficient c and outputs a result to a subtracter (SUB) 182. Additionally, the constant 255 stored in the internal register 173a is set based on the firmware stored beforehand in the ROM 32 by the main CPU 31.

The multiplier 174 multiplies the inputted data K from the selector 152 by the coefficient d and outputs the data to the subtracter 182.

The subtracter 181 outputs a difference (subtraction result) between a multiplication result inputted from the multiplier 171 and multiplication result from the multiplier 172 to the multiplier 183.

The subtracter 182 outputs a difference c×255−d×K between the multiplication result inputted from the multiplier 173 and multiplication result from the multiplier 174 to a divider (DIV) 185.

The multiplier 183 multiplies the difference (subtraction result) inputted from the subtracter 181 by the coefficient e from the selector 165, outputs result (e×(a×P−b×K)) to a multiplier 184, and further outputs lower eight bits of an integer to a selector 186. The lower eight bits of the integer is undercolor removable (UCR).

The multiplier 184 multiplies the inputted multiplication result (e×(a×P−b×K)) by the constant 255 and outputs a result to the divider 185.

The divider 185 divides the constant multiplication result (255×e×(a×P−b×K)) inputted from the multiplier 184 by a difference (c×255−d×K) from the subtracter 182 to obtain a gray component replacement (GCR). The lower eight bits of the GCR are outputted to the selector 186. Additionally, when a denominator is "0" in the calculation of GCR, the divider 185 outputs an exceptional value stored beforehand in an internal register 185a. Moreover, the exceptional value stored in the internal register 185a is set based on the firmware stored beforehand in the ROM 32 by the main CPU 31.

The selector 186 selects the lower eight bits of GCR inputted from the divider 185 and lower eight bits of UCR from the multiplier 183 in response to the selection signal from a selector 188 and outputs the bits to the selector 187. Additionally, the selector 188 switches an undercolor replacement type selected value (for the photograph) and undercolor replacement type selected value (for the character) stored in internal registers 188a, 188b and outputs the selection signal to the selector 186 in response to the identification signal from the image region identifying section 132 or another pixel attribute signal. Moreover, the undercolor replacement type selected value (for the photograph) and undercolor replacement type selected value (for the character) stored in the internal registers 188a, 188b are set based on the firmware stored beforehand in the ROM 32 by the main CPU 31.

The selector 187 selects the data from the selector 186 and data from the selector 152 in response to the selection signal from a selector 189 and outputs data Q to the next stage. Additionally, the selector 189 switches a CMY/K selected value (for the photograph) and CMY/K selected value (for the character) stored in internal registers 189a, 189b and outputs the selection signal to the selector 187 in response to the identification signal from the image region identifying section 132 or another pixel attribute signal. Moreover, the CMY/K selected value (for the photograph) and CMY/K selected value (for the character) stored in the internal registers 189a, 189b are set based on the firmware stored beforehand in the ROM 32 by the main CPU 31.

Additionally, here the outputted data Q is the color signal C in the black ink adding section 134c, and the next stage is the gray scale processor 135c. The data is the color signal M in the black ink adding section 134m, and the next stage is the gray scale processor 135m. The data is the color signal Y in the black ink adding section 134y, and the next stage is the gray scale processor 135y. The data is the color signal K in the K-plane adding section 134k, and the next stage is the gray scale processor 135k.

In this constitution, the image processing apparatus of the present invention will next be described.

The image processing apparatus of the present invention comprises: address generating means for generating an address in accordance with the difference (MAX−MIN) between the maximum value MAX and the minimum value MIN among the signals CMY indicating three primary colors of the color image for each pixel, and the minimum value MIN; the lookup table in which the data is read from the generated address; and black ink generating means for generating the black ink signal based on the data read from the lookup table. A black ink strength can independently be set with respect to density and chroma of the image.

Moreover, when the minimum value MIN is constant, a data group monotonously decreasing in accordance with an increase of the maximum value MAX is stored in the lookup table. Therefore, with a higher chroma color, a black ink amount can be decreased, and muddiness of color can be reduced.

Furthermore, when the difference (MAX−MIN) between the maximum value MAX and the minimum value MIN is constant, the data group monotonously increasing with an increase of minimum value MIN is stored in the lookup table. Therefore, the black ink amount of the color having a low chroma and high density can be increased, and a deeper black can be represented.

Additionally, the lookup table with the black ink signal stored therein has a storage capacity of a number obtained by totaling a number at which the difference (MAX−MIN) between the maximum value MAX and the minimum value MIN is an integral multiple of a predetermined value and a number at which the difference is other than the integral multiple and the maximum value MAX is equal to a maximum value (255 with eight bit data) of a defined region. That is, since it is unnecessary to dispose the storage region for all the combinations of the maximum value MAX and the minimum value MIN, the storage region can be saved.

Here, an operation of generating the black ink signal in the K-plane adding section 134k will be described with reference to FIGS. 4, 5.

First, the maximum value detector (MAX) 141 detects the maximum value MAX of the color signals C, M, Y for each pixel inputted from the filters 133c, 133m, 133y, and outputs the value to the subtracter (SUB) 146 and linear interpolation circuit 150.

The minimum value detector (MIN) 142 detects the maximum value MIN of the color signals C, M, Y for each pixel inputted from the filters 133c, 133m, 133y, and outputs the value to the subtracter (SUB) 146, two-dimensional lookup table (LUT) 147 and selector 148.

The subtracter 146 calculates the difference (subtraction result) between the maximum value MAX inputted from the maximum value detector (MAX) 141 and the minimum value MIN inputted from the minimum value detector (MIN) 142. The subtracter outputs the upper six bits of the difference (MAX−MIN) to the two-dimensional LUT 147, and outputs the lower two bits to the linear interpolation circuit 150.

The two-dimensional LUT 147 outputs the data $T_{A+1}$ and $T_A$ as the black ink signal to the linear interpolation circuit 150 based on the difference (MAX−MIN) of the upper six bits from the subtracter 146 and the minimum value MIN from the minimum value detector 142.

The linear interpolation circuit 150 interpolates between the data $T_{A+1}$ and $T_A$ and outputs the data as the black ink signal to the selector 151.

Moreover, the selector 143 selects/outputs the color signals C, M, Y inputted from the filters 133*c*, 133*m*, 133*y* for each pixel in response to the selection signal from the color selector 144. The color signal selected by the selector 143 is outputted as the data P to the selectors 148, 152, and multiplier (MUL) 171.

The selector 148 selects the minimum value MIN inputted from the minimum value detector (MIN) 142 and data P in response to the selection signal from the mode (MODE) setter 145 and outputs the value and data to the one-dimensional lookup table (LUT) 149.

The one-dimensional LUT 149 outputs the data as the black ink signal to the selector 151 based on the value inputted from the selector 148.

The selector 151 selects the data as the black ink signal inputted from the linear interpolation circuit 150 and the data as the black ink signal inputted from the one-dimensional LUT 149 in response to the selection signal outputted from the selector 153 in response to the pixel attribute signal, and outputs the data to the selector 152.

The selector 152 selects the data as the black ink signal from the selector 151 and the data P from the selector 143 in response to the selection signal outputted from the selector 154 in response to the pixel attribute signal, and outputs the data K to the multipliers (MUL) 172, 174, and selector 187.

The image processing apparatus of the present invention comprises: address generating means for generating the address based on the difference (MAX−MIN) between the maximum value MAX and the minimum value MIN among the signals CMY indicating three primary colors of the color image for each pixel, and the minimum value MIN; the lookup table in which the data is read from the generated address; and undercolor generating means for generating an undercolor signal in accordance with the data read from the lookup table. A strength of undercolor removal can independently be set with respect to the density and chroma of the image.

Moreover, when the minimum value MIN is constant, the data group monotonously decreasing with the increase of the maximum value MAX is stored in the lookup table. Therefore, with the higher chroma color, an undercolor removal amount of a chromatic color material can be decreased, and chroma can be kept.

Furthermore, when the difference (MAX−MIN) between the maximum value MAX and the minimum value MIN is constant, the data group monotonously increasing with the increase of minimum value MIN is stored in the lookup table. Therefore, for the color having a low chroma and high density, the undercolor removal amount of the chromatic color material can be increased, and a further pure black can be represented.

Additionally, the lookup table with the undercolor signal stored therein has a storage capacity of a number obtained by totaling a number at which the difference (MAX−MIN) between the maximum value MAX and the minimum value MIN is an integral multiple of a predetermined value and a number at which the difference is other than the integral multiple and the maximum value MAX is equal to a maximum value (255 with eight bit data) of a defined region. That is, since it is unnecessary to dispose the storage region for all the combinations of the maximum value MAX and the minimum value MIN, the storage region can be saved.

Here, an operation of generating the undercolor signal in the black ink adding sections 134*c*, 134*m*, 134*y* will be described with reference to FIGS. 4, 5.

First, the maximum value detector (MAX) 141 detects the maximum value MAX of the color signals C, M, Y for each pixel inputted from the filters 133*c*, 133*m*, 133*y*, and outputs the value to the subtracter (SUB) 146 and linear interpolation circuit 150.

The minimum value detector (MIN) 142 detects the maximum value MIN of the color signals C, M, Y for each pixel inputted from the filters 133*c*, 133*m*, 133*y*, and outputs the value to the subtracter (SUB) 146, two-dimensional lookup table (LUT) 147 and selector 148.

The subtracter 146 calculates the difference (subtraction result) between the maximum value MAX inputted from the maximum value detector (MAX) 141 and the minimum value MIN inputted from the minimum value detector (MIN) 142. The subtracter outputs the upper six bits of the difference (MAX−MIN) to the two-dimensional LUT 147, and outputs the lower two bits to the linear interpolation circuit 150.

The two-dimensional LUT 147 outputs the data $T_{A+1}$ and $T_A$ as the undercolor signal to the linear interpolation circuit 150 based on the difference (MAX−MIN) of the upper six bits from the subtracter 146 and the minimum value MIN from the minimum value detector 142.

The linear interpolation circuit 150 interpolates between the data $T_{A+1}$ and $T_A$ and outputs the data as the undercolor signal to the selector 151.

Moreover, the selector 143 selects/outputs the color signals C, M, Y inputted from the filters 133*c*, 133*m*, 133*y* for each pixel in response to the selection signal from the color selector 144. The color selector 144 is set to select the color signal C in the black ink adding section 134*c*, the color signal M in the black ink adding section 134*m*, and the color signal Y in the black ink adding section 134*y*. The color signal selected by the selector 143 is outputted as the data P to the selectors 148, 152, and multiplier (MUL) 171.

The selector 148 selects the minimum value MIN inputted from the minimum value detector (MIN) 142 and the data P in response to the selection signal from the mode (MODE) setter 145 and outputs the value and data to the one-dimensional lookup table (LUT) 149.

The one-dimensional LUT 149 outputs the data as the undercolor signal to the selector 151 based on the value inputted from the selector 148.

The selector 151 selects the data as the undercolor signal inputted from the linear interpolation circuit 150 and the data as the undercolor signal inputted from the one-dimensional LUT 149 in response to the selection signal outputted from the selector 153 in response to the pixel attribute signal, and outputs the data to the selector 152.

The selector 152 selects the data as the undercolor signal from the selector 151 and the data P from the selector 143 in response to the selection signal outputted from the selector 154 in response to the pixel attribute signal, and outputs the data K to the multipliers (MUL) 172, 174, and selector 187.

An undercolor replacement processing in the black ink addition of the present invention will next be described.

There are provided first undercolor generating means for generating a first undercolor component (b×K) based on three values C, M, Y indicating the three primary colors for each pixel; and second undercolor generating means for generating a second undercolor component (d×K) based on the three values C, M, Y indicating the three primary colors.

Moreover, there is also provided undercolor replacing means constituted of: first subtracting means for subtracting the first undercolor component from three values (a×P) of C, M, Y indicating the three primary colors; second subtracting means for subtracting the second undercolor component from a first constant (c×255); and calculating means for outputting a calculation result obtained by multiplying a second constant (255×e) by the subtraction result of the first subtracting means and further dividing a result by the subtraction result of the second subtracting means. The black ink replacing calculation is represented in the following equation:

$$GCR=255\times e\times(a\times P-b\times K)/(c\times 255-d\times K)$$

Additionally, when the denominator is "0", a predetermined value (exceptional value) is outputted.

Here, an operation of the undercolor replacement processing in the black ink adding sections 134c, 134m, 134y will be described with reference to FIGS. 4, 5.

First, the selector 161 switches the coefficient a (for the photograph) and coefficient a (for the character) stored in internal registers and outputs the coefficient a to the multiplier 171 in response to the identification signal from the image region identifying section 132 or another pixel attribute signal.

The multiplier 171 multiplies the data P inputted from the selector 143 by the coefficient a inputted from the selector 161 and outputs the result (a×P) to the subtracter (SUB) 181.

The selector 162 switches the coefficient b (for the photograph) and coefficient b (for the character) stored in the internal registers and outputs the coefficient b to the multiplier 172 in response to the identification signal from the image region identifying section 132 or another pixel attribute signal.

The multiplier 172 multiplies the data K inputted from the selector 152 by the coefficient b inputted from the selector 162 and outputs the result (b×K) to the subtracter 181.

The subtracter 181 outputs difference (a×P-b×K) between multiplication result (a×P) inputted from the multiplier 171 and multiplication result (b×K) inputted from the multiplier 172 to the multiplier 183.

The selector 163 switches the coefficient c (for the photograph) and coefficient c (for the character) stored in internal registers and outputs the coefficient c to the multiplier (MUL) 173 in response to the identification signal from the image region identifying section 132 or another pixel attribute signal.

The multiplier 173 multiplies the constant 255 stored in the internal register by the coefficient c inputted from the multiplier 173 and outputs result (c×255) to the subtracter (SUB) 182.

The selector 164 switches the coefficient d (for the photograph) and coefficient d (for the character) stored in the internal registers and outputs the coefficient d to the multiplier 174 in response to the identification signal from the image region identifying section 132 or another pixel attribute signal.

The multiplier 174 multiplies the data K inputted from the selector 152 by the coefficient d inputted from the selector 164 and outputs result (d×K) to the subtracter 182.

The subtracter 182 outputs difference (c×255-d×K) between the multiplication result (c×255) inputted from the multiplier 173 and multiplication result (d×K) from the multiplier 174 to the divider (DIV) 185.

The selector 165 switches the coefficient e (for the photograph) and coefficient e (for the character) stored in the internal registers and outputs the coefficient e to the multiplier (MUL) 183 in response to the identification signal from the image region identifying section 132 or another pixel attribute signal.

The multiplier 183 multiplies the difference (a×P-b×K) inputted from the subtracter 181 by the coefficient e inputted from the selector 165, outputs result (e×(a×P-b×K)) to the multiplier 184, and further outputs the lower eight bits of the integer to the selector 186.

The multiplier 184 multiplies the inputted multiplication result (e×(a×P-b×K)) inputted from the multiplier 183 by the constant 255 and outputs result (255×e×(a×P-b×K)) to the divider 185.

The divider 185 divides the constant multiplication result (255×e×(a×P-b×K)) inputted from the multiplier 184 by the difference (c×255-d×K) inputted from the subtracter 182 to obtain (GCR=255×e×(a×P-b×K)/(c×255-d×K)). The lower eight bits of the obtained GCR are outputted to the selector 186. Additionally, when the denominator is "0" in the calculation of GCR, the divider 185 outputs the exceptional value stored beforehand in the internal register 185a.

The selector 186 selects the lower eight bits of GCR inputted from the divider 185 and lower eight bits of the integer inputted from the multiplier 183 in response to the selection signal outputted from the selector 188 in response to the pixel attribute signal, and outputs the bits to the selector 187.

The selector 187 selects the data inputted from the selector 186 and the data K inputted from the selector 152 in response to the selection signal outputted from the selector 189 in response to the pixel attribute signal, and outputs the data Q to the next stage.

Figure 7:
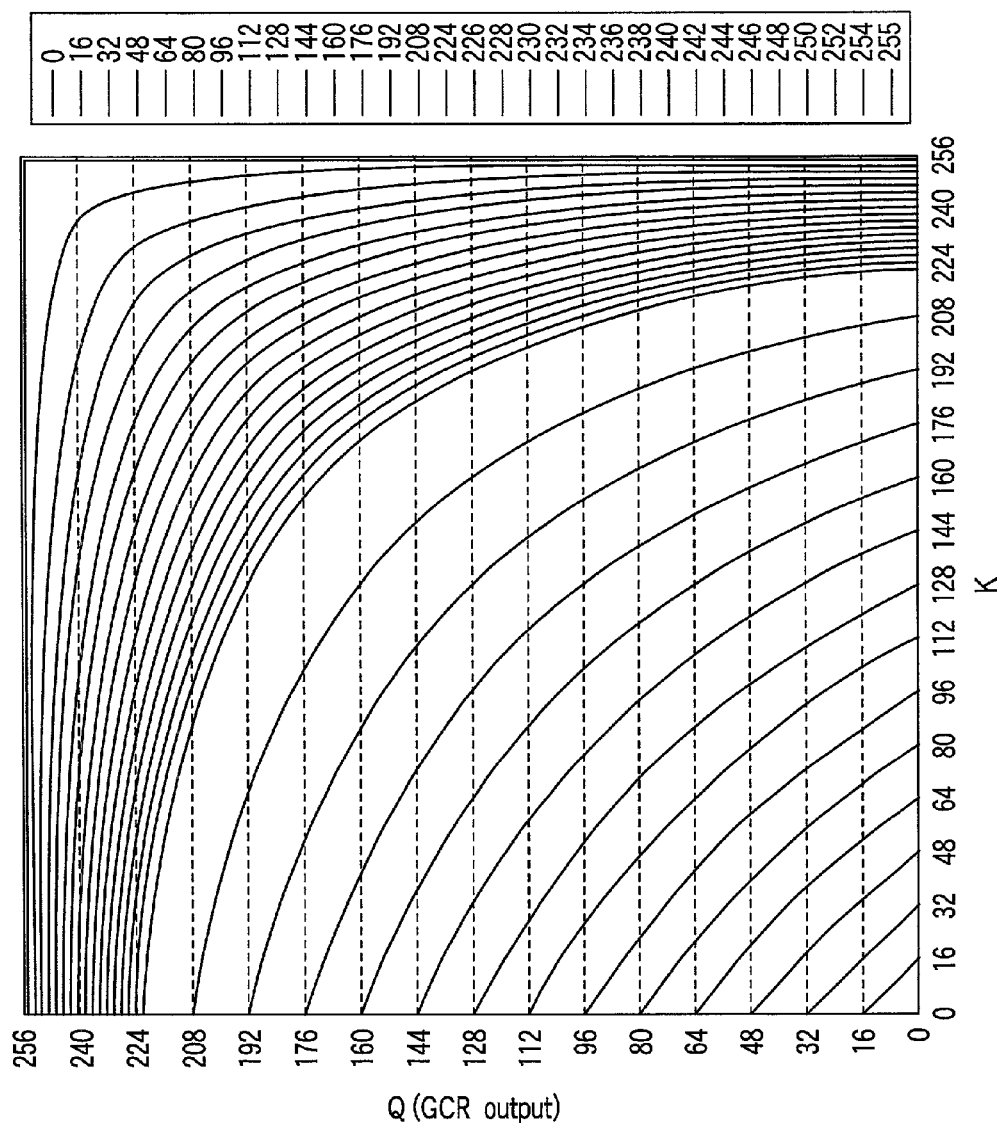
FIG. 7 is a diagram showing a conventional undercolor replacement characteristic (additionally, with K=MIN)

That is, in the conventional art, e=c=1, and b=d=1, then an undercolor replacement characteristic is shown in FIG. 7. In this case, when "a×P" is "255", the value sticks to "255". Particularly, when the data K is the minimum value MIN (K=MIN), and when the data K and "a×P" are large, GCR forms a steep fall curve.

Figure 8:
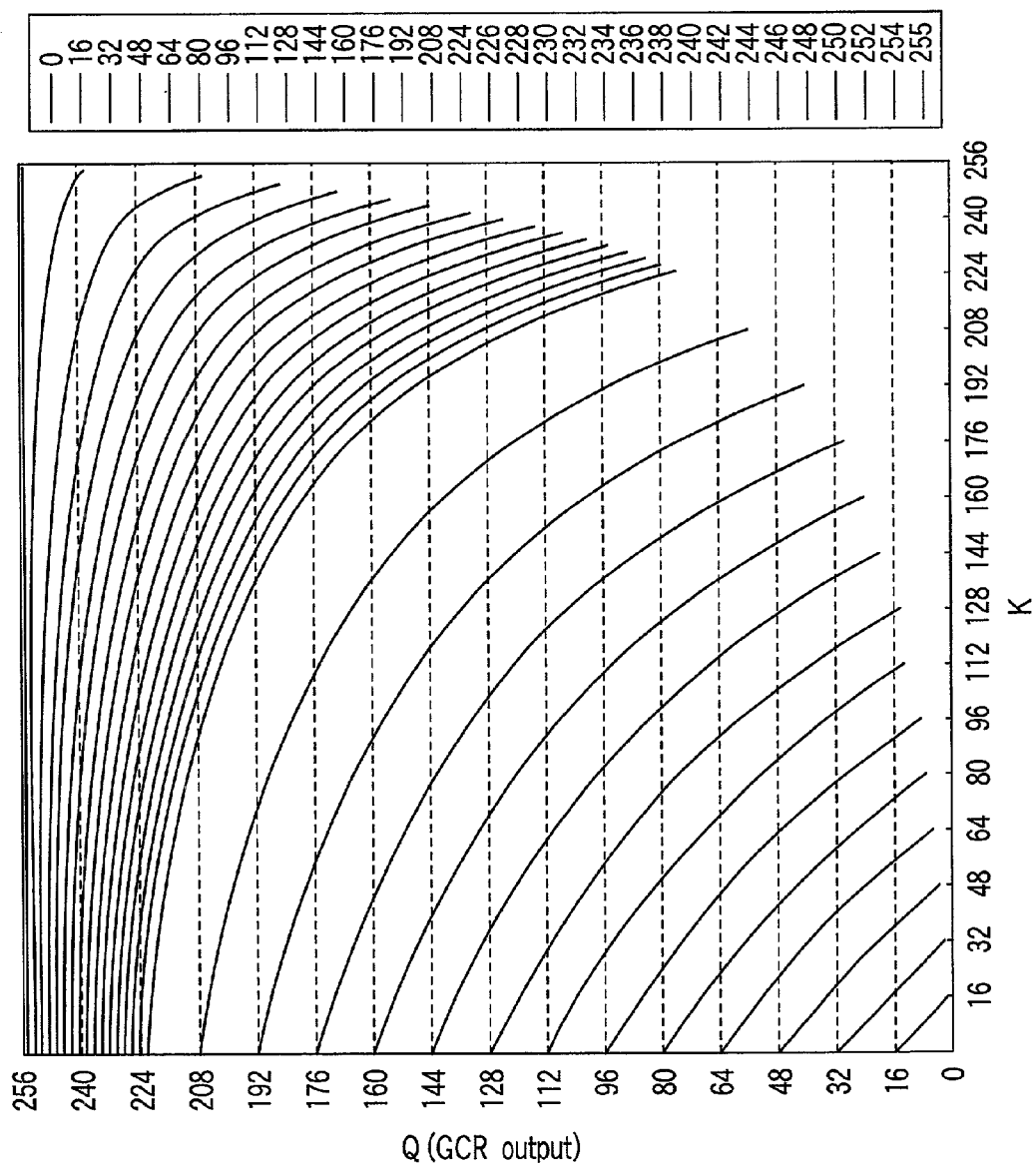
FIG. 8 is a diagram showing the conventional undercolor replacement characteristic (additionally, with K=MIN)

Moreover, in the case b=d<1, as shown in FIG. 8, a steep portion of the undercolor replacement curve can be avoided, but "a×P" inevitably sticks to "255".

Figure 9:
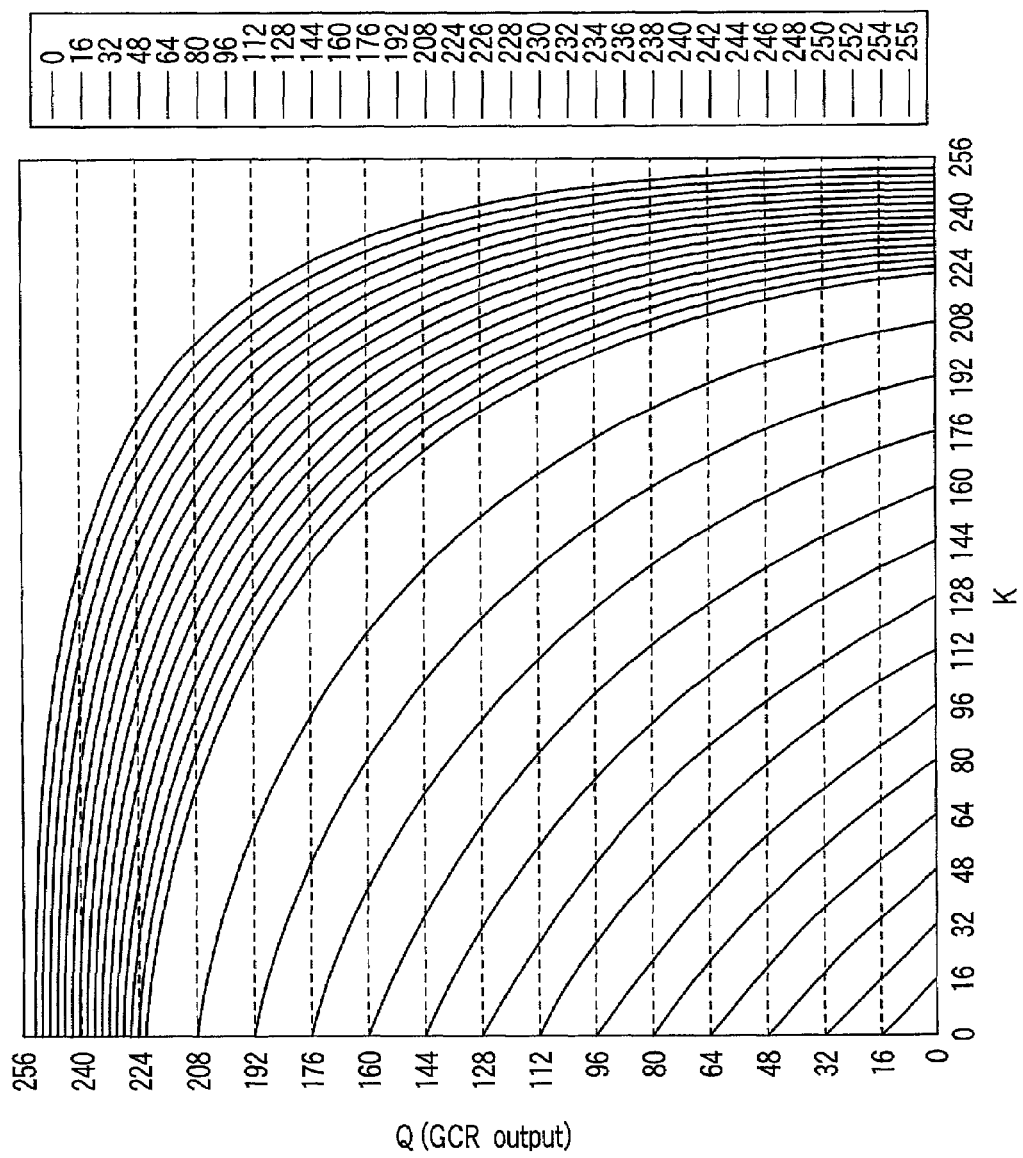
FIG. 9 is a diagram showing an undercolor replacement characteristic (additionally, with K=MIN) according to the present invention.

On the other hand, in the embodiment of the present invention, the first constant (c×255) and second constant (255×e) are set to be equal to each other and larger than the maximum value "255" of the defined region of the three primary colors CMY. Alternatively, d<b is set. Then, the sticking of the undercolor replacement characteristic curve to "255" or the steep inclination can be avoided as shown in FIG. 9. Therefore, excessive use of the color material and instability of dark color reproduction can both be solved.

As described above, according to the embodiment of the present invention, there are provided a plurality of black ink generating lookup tables and a plurality of undercolor replacement means. One is selected from these two alternatives in accordance with the image region identification information or the pixel attribute signal. Therefore, different characteristics can be imparted to reproduction of a dark portion between the character portion and the photograph portion. For example, a black-version gamma characteristic is set to be contrasty in the character portion as compared with the photograph portion. When the undercolor replacement is strengthened, a black character can be emphasized without being blurred.

What is claimed is:

1. An image processing apparatus for subjecting color image data constituted of three primary colors to black ink addition, said apparatus comprising:

identifying means for identifying a pixel attribute of each pixel in said color image data and outputting a pixel attribute signal;

first address generating means for generating a first address based on a difference between a maximum value and a minimum value among three values indicating the three primary colors for each pixel in said color image date, and said minimum value;

a first lookup table in which first data and second data are read from the first address generated by the first address generating means;

linear interpolation means for outputting data used as a black ink signal and interpolating said first data and said second data read from the first lookup table;

second address generating means for generating a second address based on the three values indicating the three primary colors for each pixel in said color image data;

a second lookup table in which data used as a black ink signal is read from the second address generated by the second address generating means; and black ink signal selecting means for selecting/outputting either one of said data used as a black ink signal read from the second lookup table or said data used as a black ink signal outputted by said linear interpolation means in accordance with the image attribute signal of the pixel outputted from said identifying means.

2. An image processing apparatus for subjecting color image data constituted of three primary colors to black ink addition, said apparatus comprising:

identifying means for identifying a pixel attribute of each pixel in said color image data and outputting a pixel attribute signal;

first address generating means for generating a first address based on a difference between a maximum value and a minimum value among three values indicating the three primary colors for each pixel in said color image data, and said minimum value;

a first lookup table in which first data and second data are read from the first address generated by the first address generating means;

linear interpolation means for outputting data used as an undercolor signal and interpolating said first data and said second data read from the first lookup table;

processing means for generating a prospective first undercolor signal based on the data read from the first lookup table;

second address generating means for generating a second address based on the three values indicating the three primary colors for each pixel in said color image data;

a second lookup table in which data used as an undercolor signal is read from the second address generated by the second address generating means;

undercolor signal selecting means for selecting/outputting either one of the data used as an undercolor signal read from the second lookup table or the data used as an undercolor signal outputted by said linear interpolation means as an undercolor signal in accordance with the image attribute signal of the pixel outputted from said identifying means; and correcting means for correcting the three values indicating said three primary colors based on the undercolor signal selected/outputted from the undercolor signal selecting means.

3. An image processing apparatus for subjecting color image data constituted of three primary colors to black ink addition, said apparatus comprising:

an identification section configured to identify a pixel attribute of each pixel in said color image data and output a pixel attribute signal;

a first address generating section configured to generate a first address based on a difference between a maximum value and a minimum value among three values indicating the three primary colors for each pixel in said color image date, and said minimum value;

a first lookup table in which first data and second data are read from the first address generated in the first address generating section;

a linear interpolation circuit configured to output data used as a black ink signal and interpolate said first data and said second data read from the first lookup table;

a second address generating section configured to generate a second address based on the three values indicating the three primary colors for each pixel in said color image data;

a second lookup table in which data used as a black ink signal is read from the second address generated in the second address generating section; and a black ink signal selecting section configured to select/output either one of said data used as a black ink signal read from the second lookup table or said data used as a black ink signal outputted by said linear interpolation circuit in accordance with the image attribute signal of the pixel outputted from said identification section.

4. An image processing apparatus for subjecting color image data constituted of three primary colors to black ink addition, said apparatus comprising:

an identification section configured to identify a pixel attribute of each pixel in said color image data and output a pixel attribute signal;

a first address generating section configured to generate a first address based on a difference between a maximum value and a minimum value among three values indicating the three primary colors for each pixel in said color image data, and said minimum value;

a first lookup table in which first data and second data are read from the first address generated in the first address generating section;

a linear interpolation circuit configured to output data used as an undercolor signal and interpolate said first data and said second data read from the first lookup table;

a processing section configured to generate a prospective first undercolor signal based on the data read from the first lookup table;

a second address generating section configured to generate a second address based on the three values indicating the three primary colors for each pixel in said color image data;

a second lookup table in which data used as an undercolor signal is read from the second address generated in the second address generating section;

an undercolor signal selecting section configured to select/output either one of the data used as an undercolor signal read from the second lookup table or the data used as an undercolor signal outputted by said linear interpolation circuit as an undercolor signal in accordance with the image attribute signal of the pixel outputted from said identification section; and a correcting section configured to correct the three values indicating said three primary colors based on the undercolor signal selected/outputted from the undercolor signal selecting section.

* * * * *